United States Patent
Scharnick (10) Patent No.: US 7,420,297 B2
(45) Date of Patent: Sep. 2, 2008

(54) COMBINATION CONTROL SYSTEM WITH INTERMEDIATE MODULE

(75) Inventor: Michael R. Scharnick, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 381 days.

(21) Appl. No.: 11/240,187

(22) Filed: Sep. 30, 2005

(65) Prior Publication Data

US 2007/0085424 A1    Apr. 19, 2007

(51) Int. Cl.
 H02H 11/00    (2006.01)
(52) U.S. Cl. ..................................... 307/326
(58) Field of Classification Search .......... 307/85, 307/326
 See application file for complete search history.

(56) References Cited

U.S. PATENT DOCUMENTS

| | | | |
|---|---|---|---|
| 5,892,299 A * | 4/1999 | Siewert et al. ............... | 307/85 |
| 6,611,416 B1 | 8/2003 | Cleereman et al. | |
| 6,628,015 B2 * | 9/2003 | Pullmann et al. ............ | 307/326 |
| 6,764,059 B2 | 7/2004 | Cleereman et al. | |
| 6,787,940 B2 * | 9/2004 | Pullmann .................... | 307/326 |
| 6,898,468 B2 * | 5/2005 | Ott et al. ...................... | 700/21 |
| 6,937,450 B1 | 8/2005 | Mayer et al. | |
| 7,212,391 B2 | 5/2007 | Cleereman et al. | |
| 2007/0061019 A1 * | 3/2007 | Scharnick et al. ........... | 700/12 |

OTHER PUBLICATIONS

Product literature concerning: ElectroGuard TM Safety Isolation System; printed Jun. 17, 2005; www.ab.com/safety/electroguard/2030_operation.html; 2003 Rockwell International Corporation.

* cited by examiner

*Primary Examiner*—Michael J Sherry
*Assistant Examiner*—Michael Rutland Wallis
(74) *Attorney, Agent, or Firm*—Whyte Hirschboeck; Alexander R. Kuszewski (57) ABSTRACT

The present invention relates to combination control systems employing at least one intermediate module between different control modules and, in one embodiment, relates to a system for isolating a load from multiple power sources. The system includes a first power isolation system capable of receiving a first power from a first input port and determining whether the first power is communicated to a first output port, and a second power isolation system capable of receiving a second power from a second input port and determining whether the second power is communicated to a second output port. The system further includes an intermediate module connected with the first and second power isolation systems, where the intermediate module allows for at least one intermediate control signal to be provided to both of the power isolation systems.

21 Claims, 5 Drawing Sheets

COMBINATION CONTROL SYSTEM WITH INTERMEDIATE MODULE

CROSS-REFERENCE TO RELATED APPLICATIONS

STATEMENT REGARDING FEDERALLY SPONSORED RESEARCH OR DEVELOPMENT

FIELD OF THE INVENTION

The present invention relates to control systems such as, for example, industrial control systems for disconnecting, grounding and/or isolating industrial loads with respect to various sources of power such as electrical, pneumatic and hydraulic sources of power.

BACKGROUND OF THE INVENTION

In a variety of environments, including for example industrial environments, there is a need for control systems that are capable of governing the operation of one or more pieces of equipment or machinery in a manner that is highly reliable. Such control systems often employ a high degree of redundancy in their various circuits and other components, so as to guarantee or nearly guarantee that the control systems will achieve intended goals in operating the controlled equipment/machinery and, in the event of failures, that the control systems will operate in such manners that the control systems and the controlled equipment/machinery enter predicted failure states.

Among these control systems are control systems that are designed to disconnect, ground and/or otherwise isolate controlled equipment/machinery from one or more power sources in a predictable, reliable manner. Such control systems reduce the chance that the controlled equipment/machinery might be unintentionally restarted at times when it is being accessed by repair personnel or technicians for purposes of repair or modification, and thereby enhance the confidence and rapidity with which such personnel can accomplish such repairs/modifications. The power sources from which the controlled equipment/machinery are isolated by these control systems can include any of a number of power sources including, for example, electrical, pneumatic and hydraulic power sources.

Figure 1:
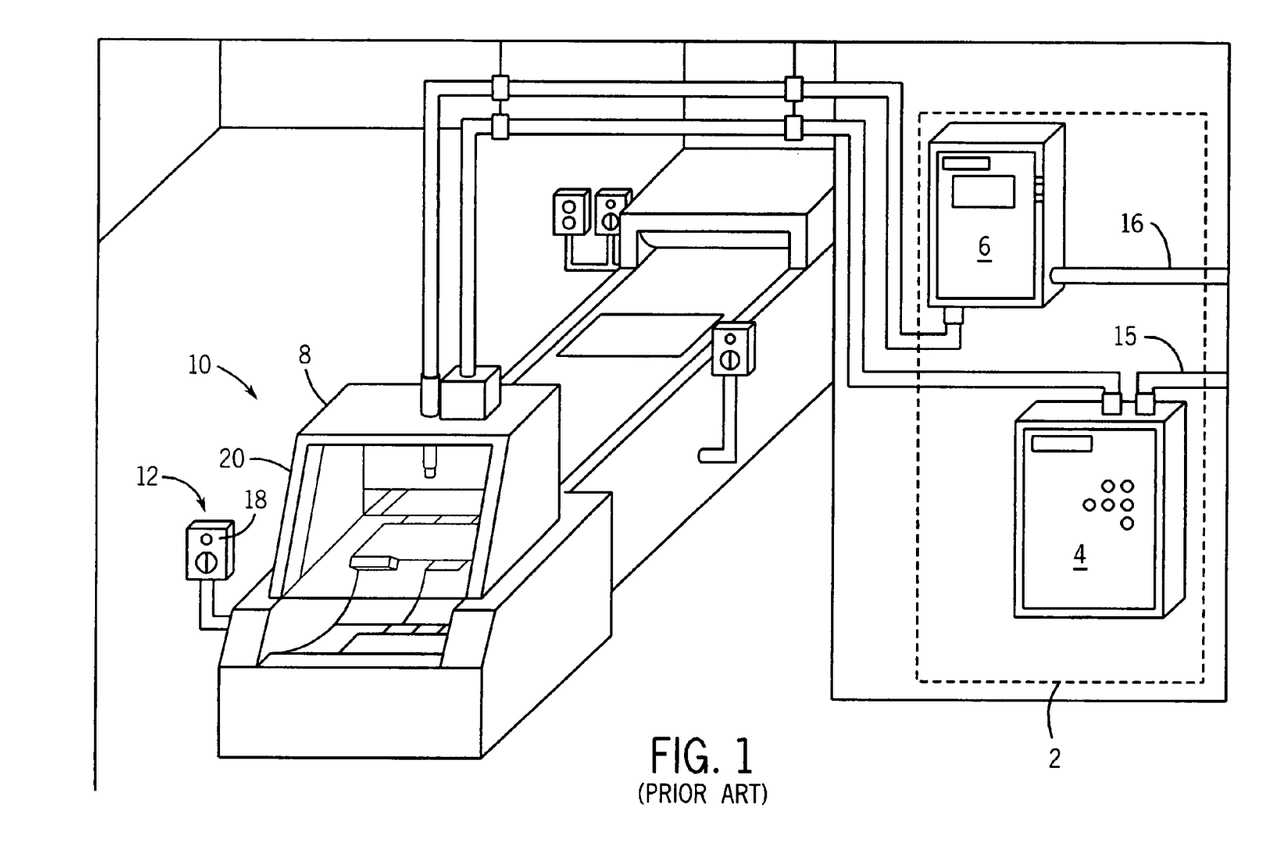
FIG. 1 is a perspective view of an exemplary Prior Art industrial system employing a control system that is capable of isolating loads from two different sources of power.

Referring to FIG. 1, one Prior Art control system of this type is the ElectroGuard™ Bulletin 2030 Safety Isolation System available from Rockwell Automation, Inc. of Milwaukee, Wis., the beneficial assignee of the present application. This control system, shown in FIG. 1 as a control system 2, includes both an electrical power isolation system 4 and a pneumatic (or hydraulic) power isolation system 6, and operates as follows.

When a failure or other condition occurs at a machine 8 of an industrial system 10 (in this case, an assembly line), and an operator appropriately switches or triggers a remote lockout switch (RLS) 12 associated with that machine to an "OFF" position, the control system 2 serves to disconnect both electric power and pneumatic power lines 15 and 16, respectively, from the machine so as to decouple the machine from both of those types of power. Additionally, the control system 2 then further serves to ground the machine 8.

Once the machine 8 has been isolated in this manner, an indication is provided to the operator (e.g., a light 18 turns on) indicating that it is appropriate for the operator to access the machine for purposes of making a repair or some other modification to the machine. Typically the operator will then access the machine by entering into a normally-inaccessible region, e.g., by opening a gate 20 and entering into the machine as shown (alternatively, for example, the operator could pass through a light curtain).

Once the operator has completed the repair or modification and left the normally-inaccessible region, the operator appropriately switches or triggers the RLS 12 again, this time to an "ON" position. After this occurs, the control system 2 reestablishes the connections between the power sources and the machine 8. The control system 2 typically employs redundant circuitry such as safety relays to enhance the control system's reliability in performing its control functions in this regard.

Although control systems such as the control system 2 shown in FIG. 1 are useful, such control systems are typically designed to have only limited purpose(s) and functionality. In particular, the control system 2 serves the purposes of disconnecting/connecting one or more machines such as the machine 8 from a single electrical power source and/or a single pneumatic or hydraulic power source, grounding the machine(s), and conducting related communications with RLSs such as the RLS 12.

In certain applications, however, it would be advantageous if such control systems could be reconfigured in a manner allowing for expanded functionality. For example, there are many machines or combinations of machines that require more than one type of electrical power, e.g., both 240V power and 480V power. Likewise, there are many machines that require more than one type of pneumatic and/or hydraulic power for their operation. In applications involving such machines or combinations of machines, it would be advantageous if control systems of the aforementioned type could be utilized to disconnect or connect machine(s) to or from more than one electrical power source, simultaneously or in an otherwise correlated manner. Likewise, it would also be advantageous if control systems of the aforementioned type could be utilized to disconnect or connect machine(s) to or from more than one pneumatic and/or hydraulic power source, simultaneously or in an otherwise correlated manner.

Despite the desirability of providing such additional functions in some circumstances, it is not possible to reconfigure conventional control systems such as the control system 2 to achieve such additional functions in the field. Largely this is because such conventional control systems are carefully designed to include sufficient redundancy to enhance reliability and behave in predictable manners during failures. Reconfiguration of such conventional control systems in the field could unpredictably alter the control systems' behavior and undermine the control systems' reliability, and consequently conventional control systems typically are designed in a manner that prevents such ad hoc reconfigurations.

Given that it would be desirable for reliable, failure-resistant control systems such as the control system 2 to have expanded capabilities, particularly in terms being able to disconnect/connect, isolate and/or ground machines in relation to more than one electrical power source and/or more than one pneumatic/hydraulic power source, and given that conventional systems of this type are not readily reconfigurable to provide such capabilities, it would be advantageous if improved control system(s) having these capabilities were developed. Further, it would also be advantageous if such an improved control system achieved similar levels of redundancy, reliability and failure-resistance as conventional control systems of this type.

BRIEF SUMMARY OF THE INVENTION

The present inventor has recognized the desirability of reliable, failure-resistant control systems with expanded capabilities in terms of being able to disconnect/connect, isolate and/or ground machines with respect to more than one type of electrical power source and/or more than one pneumatic/hydraulic power source. The present inventor further has recognized that, in some embodiments, such an improved control system could be achieved by combining multiple conventional control systems, each with the capability of providing control in relation to a corresponding electrical power source (or sources) and/or a corresponding pneumatic/hydraulic power source (or sources), through the use of a multiplexer module coupled between user input switches (or other control devices) and the multiple control systems. Additionally, the present inventor has recognized that, in some embodiments, such an improved control system could be achieved by combining a conventional electrical power isolation system with multiple pneumatic/hydraulic power isolation systems, each with the capability of providing control in relation to a corresponding pneumatic/hydraulic power source (or sources), through the use of a multiplexer module coupled between the electrical power isolation system and each of the pneumatic/hydraulic power isolation systems. In at least some other embodiments, further combinations of power isolation systems could be arrived at through the use of one or more intermediate modules. Also, in at least some embodiments, feedback signals can be provided via such intermediate modules from the power isolation systems being controlled to the controlling devices (e.g., input switches or other control devices, including control devices of other power isolation systems).

More particularly, in at least some embodiments, the present invention relates to a system for isolating at least one load from multiple power sources. The system includes a first power isolation system capable of receiving a first power from a first input port and determining whether the first power is communicated to a first output port, and a second power isolation system capable of receiving a second power from a second input port and determining whether the second power is communicated to a second output port. The system further includes an intermediate module connected with the first and second power isolation systems, where the intermediate module allows for at least one intermediate control signal to be provided to both of the power isolation systems.

Additionally, in at least some embodiments, the present invention relates to an intermediate module for use in combining a plurality of safety isolation systems. The intermediate module includes at least one first terminal configured to receive at least one input signal, and at least one second terminal configured to provide at least one output signal. The module further includes means for processing the at least one input signal to generate the at least one output signal, where the means for processing includes at least one redundant component that enhances reliability of the intermediate module.

Further, in at least some embodiments, the present invention relates to method of providing a safety isolation system having at least one of more than one electrical power isolation system and more than one fluidic power isolation system. The method includes providing at least two power isolation systems, where the at least two power isolation systems include at least one of the more than one electrical power isolation system and the more than one fluidic power isolation system. The method additionally includes providing an intermediate module, coupling the at least two power isolation systems to the intermediate module, and coupling the intermediate module to an additional device. The additional device is an external device when the at least two power isolation systems includes the more than one electrical power isolation system, and the additional device is an additional power isolation system when the at least two power isolation systems includes the more than one fluidic power isolation system.

Additionally, in at least some embodiments, the present invention relates to an apparatus for coordinating operations of a plurality of power isolation systems. The apparatus includes at least one first port that receives at least one command signal and also provides at least one first feedback signal. The apparatus also includes a plurality of second ports that respectively provide a plurality of related signals to the plurality of power isolation systems and receive a plurality of second feedback signals from the plurality of power isolation systems. The apparatus further includes at least one internal circuit component coupled to the first port and the plurality of second ports. Due at least in part to the at least one internal circuit component, the first feedback signal indicates when at least one of the second feedback signals fails to indicate that an isolation condition of the respective power isolation system has been met.

DETAILED DESCRIPTION OF THE PREFERRED EMBODIMENT

In at least some embodiments, the present invention can be part of a "safety system" used to protect human life and limb in an industrial or other environment. Nevertheless, the term "safety" as used herein is not a representation that the present invention will make an industrial or other process safe or that other systems will produce unsafe operation. Safety in an industrial or other process depends on a wide variety of factors outside of the scope of the present invention including, for example: design of the safety system, installation and maintenance of the components of the safety system, and the cooperation and training of individuals using the safety system. Although the present invention is intended to be highly reliable, all physical systems are susceptible to failure and provision must be made for such failure.

Figure 2:
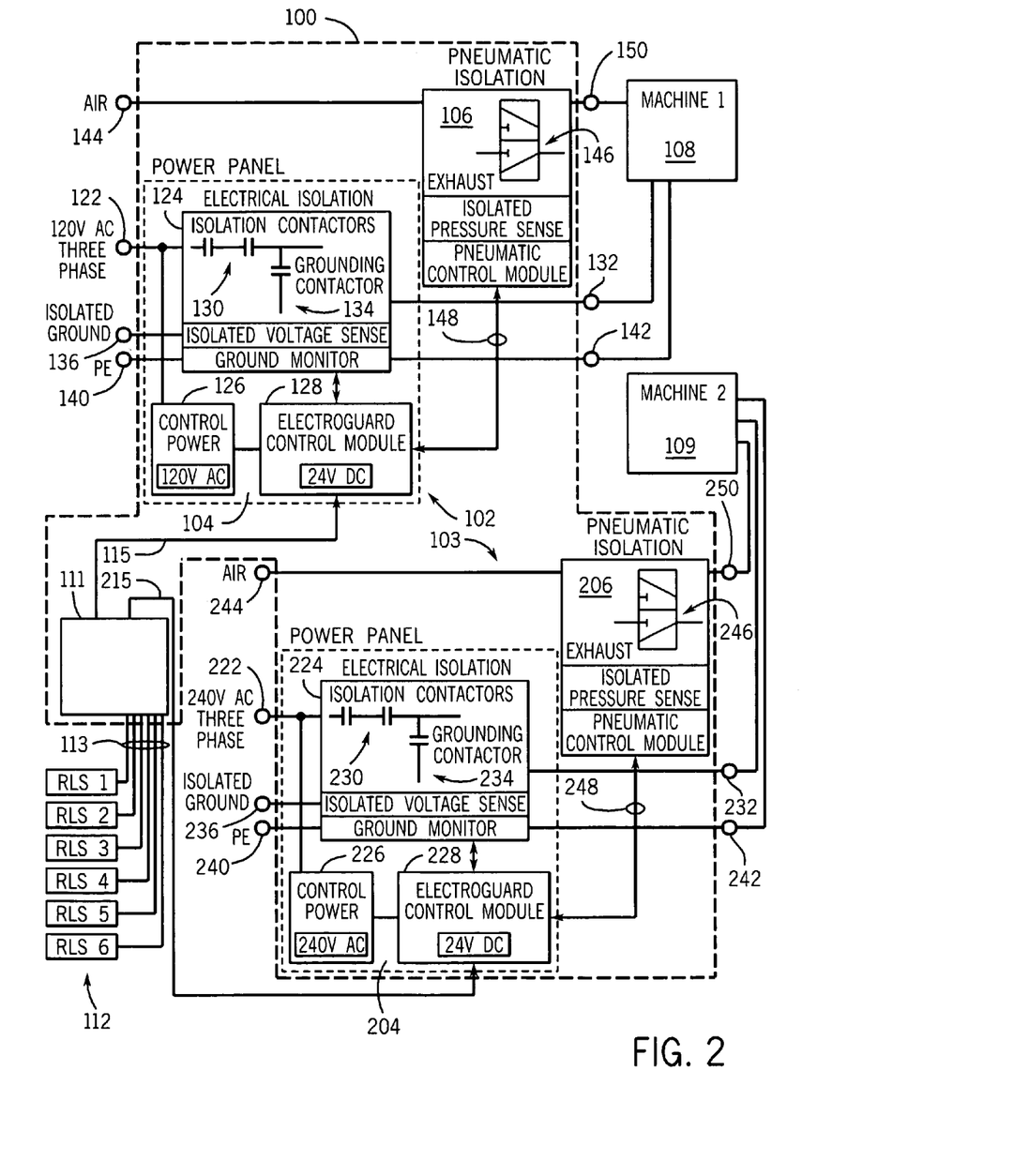
FIG. 2 shows in schematic form an improved control system in accordance with one exemplary embodiment of the present invention, where the improved control system includes multiple (in this case, two) subsidiary control systems and a multiplexer module coupled between remote lockout switches and each of those multiple control systems.

Referring to FIG. 2, an improved control system 100 in accordance with certain embodiments of the present invention is shown to be coupled to and in communication with multiple remote lockout switches (RLSs) 112 and first and second controlled machines 108 and 109, respectively. As discussed above with respect to FIG. 1, the machines 108, 109 could be implemented as part of an assembly line or other industrial system. However, the machines 108, 109 each are also generally intended to be representative of one or more machines or other pieces of equipment of a variety of types for implementation in a variety of industrial or other circumstances, for example, in other large facilities that implement various processes such as hospitals, airports (e.g., a baggage handling system), etc. The machines 108, 109 could also be replaced with a single machine, depending upon the embodiment.

As shown, the control system 100 in the present embodiment includes first and second control modules 102 and 103, respectively. As with the control system 2 discussed with respect to FIG. 1, each of the control modules 102, 103 includes a respective electrical power isolation system 104 and 204, respectively, as well as a respective pneumatic power isolation system 106 and 206, respectively, and thus in at least some embodiments (including the present embodiment) each of the modules 102, 103 can be a safety isolation system such as the above-mentioned Electroguard™ Safety Isolation System. Although the power isolation systems 106, 206 shown in FIG. 2 are pneumatic power isolation systems, those systems are generally representative of (and could be replaced with) other types of "fluidic" power isolation systems such as hydraulic power isolation systems, rather than merely pneumatic power isolation systems. Further, with respect to the present embodiment, the respective first and second control modules 102, 103 are respectively coupled to, and govern the conveyance of power to and isolation of, the respective machines 108, 109.

In the present embodiment, each of the electrical power isolation systems 104, 204 receives three-phase power from a three-phase power source (not shown), by way of a respective electrical input port 122 and 222, respectively. While in alternate embodiments the three-phase power provided to the input ports 122 and 222 can be of the same type (e.g., from the same source), in the present embodiment the respective powers provided to the respective two input ports are of different types, e.g., the power provided to the input port 122 is 240V AC power while the power provided to the input port 222 is 480V AC power.

The respective three-phase powers received at the respective electrical input ports 122, 222 are provided both to respective electrical isolation modules 124, 224 of the two electrical power isolation systems 104, 204, and also to respective control power modules 126, 226 of the two electrical power isolation systems. The respective control power modules 126, 226 of the electrical power isolation systems 104, 204 convert the respective three-phase powers into 120 Volt AC power, which is then provided to respective internal control modules 128, 228 of the respective electrical power isolation systems.

Further as shown, the control system 100 additionally includes a multiplexer module 111 that is coupled to each of the internal control modules 128, 228 within the control system 100 by way of respective communication links 115 and 215, respectively, and also is coupled to each of the RLSs 112 external to the control system 100 by way of respective communication links 113. In accordance with the present embodiment, each of the internal control modules 128, 228 governs the operation of the respective electrical isolation module 124, 224 to which it is coupled. The operation of the internal control modules 128, 228 in this regard is based upon one or more signals that are provided to the internal control modules 128, 228 from one or more of the multiple RLSs 112 by way of the multiplexer module 111.

Typically, when one or more of the RLSs 112 are appropriately switched or triggered to an "OFF" position, the multiplexer module 111 receives the signal(s) from those RLS(s) and then communicates a corresponding signal to each of the internal control modules 128, 228. Upon receiving these signals, the respective internal control modules 128, 228 cause respective isolation contactors 130, 230 within the respective electrical isolation modules 124, 224 to open so as to disconnect the respective three-phase powers received at the respective electrical input ports 122, 222 from respective electrical output ports 132 and 232. The respective machines 108, 109, which are respectively coupled to the respective output ports 132, 232, are thus disconnected from the respective electrical power sources.

Subsequently, respective grounding contactors 134, 234 within the respective electrical isolation modules 124, 224 are further actuated by the respective internal control modules 128, 228 so as to couple the respective electrical output ports 132, 232 to respective isolated ground ports 136, 236 of the respective electrical power isolation systems 104, 204. By virtue of the operation of the isolation contactors 130, 230 and the grounding contactors 134, 234, the respective machines 108 and 109 are entirely isolated from the respective three-phase power sources coupled to the respective input ports 122, 222.

Also as shown, each of the electrical power isolation systems 104, 204 includes a respective protective earth (PE) input terminal 140 and a PE output terminal 142. The PE input terminal 140 is coupled to a standard earth ground, and the PE output terminal 142 is coupled both to the PE input terminal 140 and in turn to the machine 108 such that the machine has access to the standard earth ground. The grounding contactor 134 couples the electrical output port 132 to the isolated ground port 136. The isolated ground is connected to the PE input terminal 140 at the main service entrance. Thus, by virtue of the operation of the isolation contactors 130 and the grounding contactors 134, the machine 108 is entirely isolated from the three-phase power source and grounded. It should be noted that each of the input ports 122, 222, 136, 236, 140, 240 and output ports 132, 232, 142 and 242 is an input/output port with respect to its respective system 104, 204, with respect to its respective control module 102, 103 and with respect to the overall improved control system 100.

Further as shown, the respective pneumatic power isolation systems 106, 206 of the respective control modules 102, 103 are respectively capable of receiving pressurized air at respective air input ports 144, 244. Respective sets of one or more valves 146, 246 within the respective pneumatic power isolation systems 106, 206 are controlled by way of signals provided from the respective internal control modules 128, 228 of the respective electrical power isolation systems 104, 204, to which the respective pneumatic power isolation system 106, 206 are coupled by way of respective sets of one or more communication links 148, 248.

Given this structure, the operation of the respective pneumatic power isolation systems 106, 206 is governed by the respective internal control modules 108, 228 of the respective electrical power isolation systems 104, 204 as follows. When one or more of the RLSs 112 is appropriately switched or triggered to the "OFF" position, signal(s) are provided from those RLS(s) to the multiplexer module 111, which in turn provides corresponding respective signals to each of the respective internal control modules 128, 228. Each of the respective internal control modules 128, 228 in turn provides respective signal(s) to the respective pneumatic power isolation systems 106, 206 causing respective air output ports 150, 250 of those systems to be decoupled and isolated from the respective air input ports 144, 244. It should be noted that the air input ports 144, 244 and air output ports 150, 250 are input/output ports of each of the respective pneumatic power isolation systems 106, 206, the respective control modules 102, 103 and the overall improved control system 100.

Thus, when one or more of the RLSs 112 is switched or triggered to the "OFF" position, the machines 108 and 109, which are respectively coupled to the sets of output ports 132, and 150 and 232, and 250, respectively, both cease to receive any electrical or pneumatic power and are isolated from the power sources coupled to the input ports 122, 144 and 222, 244, respectively. That is, the internal control modules 128, 228 cause the control modules 102, 103 to enter an isolated state such that the machines 108, 109 are isolated from each of the different types of power (e.g., electrical, pneumatic, and/or hydraulic) that were being provided to the machines. When each of the control modules 128 and 228 has determined that all forms of energy have been isolated (e.g., such that it is now appropriate for the operator to enter the system), feedback is provided from those control modules to the multiplexer module 111, which in turn provides one or more signals causing a system isolated light (not shown) on each RLS 112 that is switched to the "OFF" position to be illuminated. If either of the control modules 128 and 228 determine that isolation has not occurred, the system isolated lights on the RLS(s) will not illuminate. However, when the RLSs 112 are appropriately switched or triggered in the reverse direction to the "ON" position, the respective internal control modules 128, 228 cause the respective electrical power isolation systems 104, 204 and the respective pneumatic power isolation systems 106, 206 to reestablish the connections between those power sources and the respective machines 108, 109.

With the above-described structure, the improved control system 100 in contrast to conventional control systems such as that of FIG. 1 is able to control the delivery of two types of electrical power and two types of pneumatic (or other fluidic, e.g., hydraulic) power to the machines 108, 109, rather than merely control the delivery of one type of electrical power and one type of pneumatic (or other fluidic) power. This capability is made possible by the combining of the two control modules 102, 103 through the use of the multiplexer module 111. When the multiplexer module 111 receives the signals from the RLSs 112, it provides duplicative signals to each of the control modules 102, 103, which in turn causes each of those control modules to respond in the same way as one another and in the same way as each of those control systems would have responded had the signals from the RLSs been provided directly to the internal control modules 128, 228 of those control systems. It also takes the feedback signals from each control module and only allows the system isolated light(s) of the RLS(s) 112 to illuminate if all the control modules have determined that isolation has occurred (e.g., such that it is appropriate for the operator to enter a related station to work on machines, etc.). In some alternate embodiments, it would also be possible for the multiplexer module 111 to be configured so as to allow system isolated light(s) of the RLS(s) 112 to turn on even if not all (e.g., but rather a subset) of the control modules had determined that isolation had occurred, for example, in situations where some other significant or overriding condition was met, or where the isolation of certain of the power isolation systems was not as important as the isolation of others of the power isolation systems.

In at least some embodiments, the multiplexer module 111 is in bidirectional communications with the RLSs 112 and the internal control modules 128, 228. Such bidirectional communications not only allows commands from the RLSs to be provided to the multiplexer module and then to the control modules 128, 228, but also allows feedback to be provided from the internal control modules back to the multiplexer module and ultimately back to the RLSs. In some such embodiments (such as that discussed with reference to FIG. 3 below), the multiplexer module 111 is configured such that it is able to monitor the behavior of each of the control modules 128, 228 (and/or their respective power isolation systems or events of the machines to which they are coupled) to make sure that, in response to a given RLS command that all of the power isolation systems enter an isolated state, in fact all of the power isolation systems do enter such isolated state. Further, when the multiplexer module determines that all (rather than merely some) of the power isolation systems have entered the isolated state, the multiplexer module then sends a signal indicative of this fact to the RLS at which the original command was provided (or possibly to all of the RLSs 112). The sending of such an indication signal to the RLS (or RLSs) in turn allows that RLS or some other device to provide an indication (e.g., the turning on of an indicator light) that the machines 108, 109 have been isolated from the various power sources. Until such time, the RLS might instead provide a signal indicating that not all of the machines were isolated.

Figure 3:
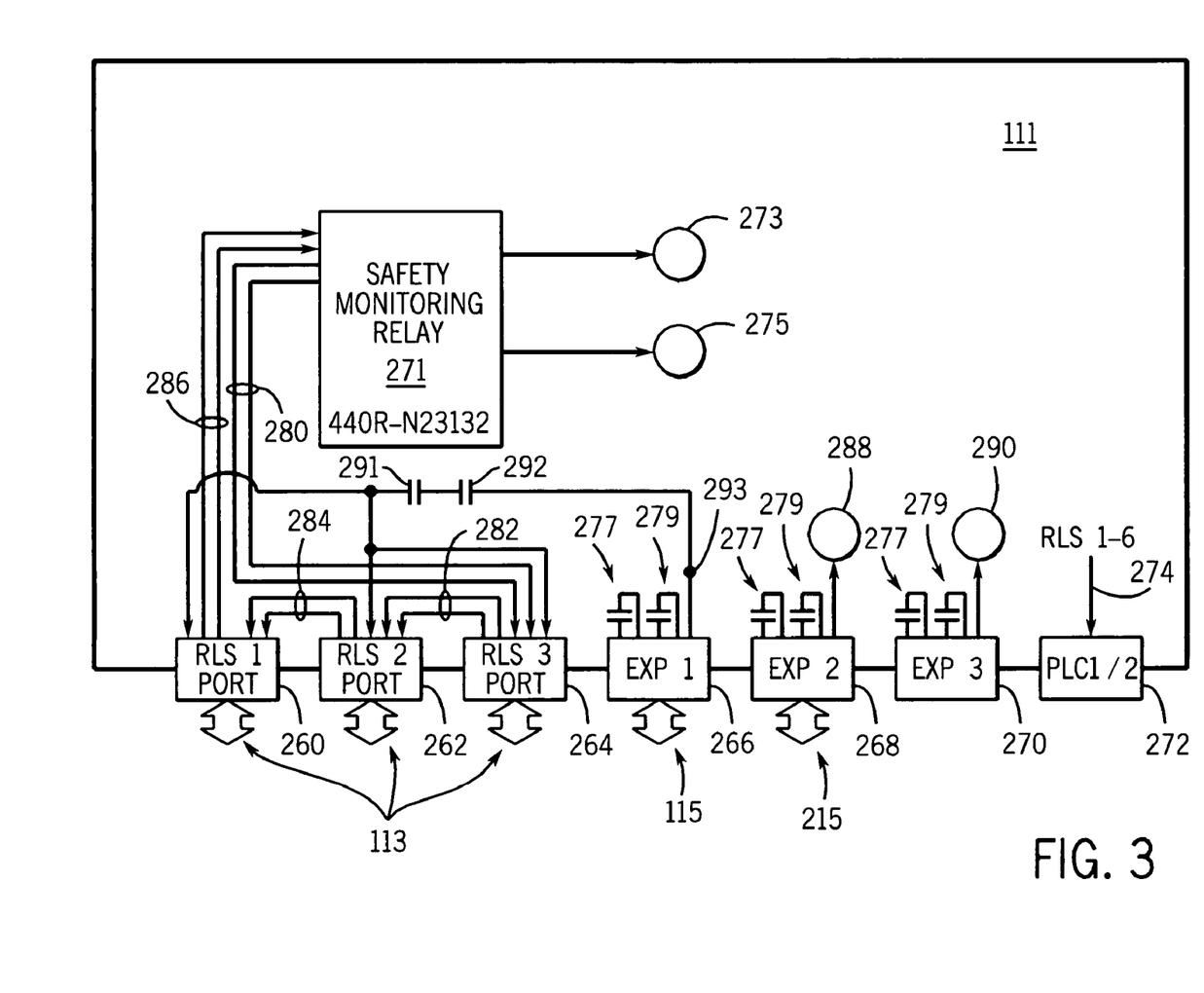
FIG. 3 shows in schematic form an exemplary embodiment of the multiplexer module of FIG. 2 in more detail.

Turning to FIG. 3, one exemplary embodiment of the multiplexer module 111 of FIG. 2 is shown in more detail. In this embodiment, the multiplexer module 111 includes first, second and third RLS ports 260, 262 and 264, respectively, which are respectively coupled to those of the communication links 113 that are coupled to the first, second and third RLSs, respectively. Because only three RLS ports 260, 262 and 264 are included in the multiplexer module 111, the present embodiment of the multiplexer module (in contrast to that shown in FIG. 2) is only able to communicate with three RLSs (e.g., RLS1, RLS2 and RLS3 shown in FIG. 2). However, it should be understood that, depending upon the embodiment, any number of RLS ports could be included as part of the multiplexer module to allow for coupling of the multiplexer module to an arbitrary number of RLSs.

Additionally, the multiplexer module 111 of FIG. 3 also includes first, second and third ports 266, 268 and 270, respectively (shown also as "EXP 1, EXP 2 and EXP 3"), by which the multiplexer module can be coupled to up to three different internal control modules corresponding to up to three different power isolation systems included within an overall control system such as the control system 100 of FIG. 2. In the case where, as shown in FIG. 2, the control system 100 includes only the two internal control modules 128, 228, only the first and second ports 266, 268 are respectively coupled to the two communication links 115 and 215, respectively. However, in an embodiment in which a third internal control module and corresponding communication link were present, the third port 270 likewise could be coupled to such internal control module by such additional communication link (not shown). In further embodiments, the multiplexer module 111 could be modified to include further ports like the ports 266, 268, 270 to accommodate still additional internal control modules (or, in some embodiments, the multiplexer module 111 might only have two of the ports 266, 268 and 270).

Further, the multiplexer module 111 of FIG. 3 is also shown to include a further PLC (programmable logic controller) port 272, which is figuratively shown to receive signals 274 communicated also from the RLSs (e.g., as received by the RLS ports 260, 262, 264, etc.). In certain embodiments, the PLC port 272 can be coupled by way of an additional communication link to a PLC, for the purpose of communicating status information (e.g., regarding the status of the RLSs or the control system 100) to the PLC.

Additionally as shown in FIG. 3, the multiplexer module 111 also includes a safety monitoring relay (or simply safety relay) 271, which is in communication with (or includes) redundant first and second coils (which could be a safety monitoring relay expansion unit) 273 and 275, respectively. Actuation (e.g., energizing) of the first coil 273 causes corresponding first normally-open contacts 277 of each of the first, second and third ports 266, 268 and 270 to close, while actuation of the second coil 275 causes corresponding second normally-open contacts 279 of each of those ports to close. Also, the safety relay 271 is in communication with each of the RLS ports 260, 262 and 264. This could be accomplished by way of a pair of redundant, daisy-chained communication links (or, alternatively, by way of a modular safety monitoring safety relay). More particularly, the safety relay 271 sends out two redundant signals by way of a pair of communication links 280, which in turn are coupled to the third RLS port 264.

The third RLS port 264 in turn, depending upon its status (which in turn depends upon the signal being received or not received from the corresponding RLS via one of the communication links 113) communicates the two redundant signals by way of a pair of communication links 282, which in turn are coupled to the second RLS port 262. The second RLS port 262 in turn, depending upon its status (again depending upon the status of its corresponding RLS) communicates the two redundant signals by way of a further pair of communication links 284, which in turn are coupled to the first RLS port 260. The first RLS port 260 in turn, depending upon its status (again depending upon the status of its corresponding RLS) communicates the two redundant signals by way of an additional pair of communication links 286, which in turn are coupled back to the safety relay circuit 271.

Further, each of the second and third ports 268 and 270 (but not the first port 266) has a respective coil 288 and 290, respectively (which instead could also be a safety monitoring relay), each of which is normally deenergized. Each of the coils 288 and 290 when energized causes the closing of a respective normally-open contact 291 and 292, respectively, where the contacts 291 and 292 are coupled in series between the first port 266 and each of (e.g., the parallel combination of) the RLS ports 260, 262 and 264. As for the first port 266, while that port does not have a coil corresponding to the coils 288, 290, that port instead is coupled to an end node 293 of the series combination of the contacts 291, 292. Further, the first port 266 is normally deenergized but, when energized, the first port 266 provides power to the end node 293 coupled to the series combination of the contacts. Consequently, normally, no power is applied to the end node 293 and the contacts 291 and 292 are open, such that no signal is applied to the RLS ports 260, 262, and 264 from the port 266 by way of the end node 293 and the contacts 291, 292.

In the present embodiment, the safety relay 271 is a 440R-N23132 safety relay available from Rockwell Automation, Inc. of Milwaukee, Wis., the beneficial assignee of the present application, each of the first and second coils 273 and 275 is a 440R-E23097 safety relay, and (possibly) each of the coils 288, 290 is a 440R-B23020 safety monitoring relay, also available from Rockwell Automation, Inc. However in alternate embodiments, any of a variety of other types of safety relay circuits, or coils or other circuit components, could be employed.

As indicated by bidirectional arrows shown in FIG. 3 corresponding to the communication links 113, 115 and 215, each of the RLS ports 260, 262 and 264 and other ports 266, 268 and 270 are configured for bidirectional communication. That is, each of the RLS ports 260, 262 and 264 is capable of receiving signals from corresponding ones of the RLSs 112 (e.g., indicative of an on/off status of those RLSs) and also is capable of providing feedback signals to those RLSs. Likewise, each of the RLS ports 266, 268 and 270 is capable of providing command signals to the corresponding system control modules (e.g., the two control modules 102, 103 of FIG. 2) and also receiving feedback signals from those control modules. In at least some of these cases, multiple redundant signals are sent. For example, with respect to the operation of the ports 266, 268, 270, those ports are configured to send two redundant signals corresponding to their respective pairs of first and second contacts 277, 279 to their respective control modules. Thus, in the present embodiment, the communication links 113, 115, 215 are each representative of sets of communication links.

Given the above-described structure, the multiplexer module 111 of FIG. 3 can operate in conjunction with three of the RLSs 112 and the two control modules 102, 103 of FIG. 2 as follows. Assuming that, at a start time, none of the RLSs 112 has been switched "OFF" (e.g., so as to cause isolation), all of the RLS ports 260, 262 and 264 serve as "closed circuits" relative to the daisy-chained communication links 280, 282, 284 and 286, such that the signal provided onto the links 280 is received back at the safety relay by way of the links 286. Consequently, both of the coils 273, 275 are energized, and all of the normally-open contacts 277, 279 are closed. As a result, signals are provided by way of the communication links 115, 215 from the ports 266, 268 to the respective control modules 102, 103 that would cause the control modules 102, 103 to cause the respective safety isolation systems to be in an energized state (e.g., one in which energy is being provided to the machines 108,109) and not in an isolated state.

Further (assuming there to be no problem), since the control modules 102, 103 should at this time not be causing isolation, no feedback signals indicating isolation are provided back from the control modules 102, 103 to the ports 266, 268 that would cause the port 266 to provide power to the end node 293 or cause the coil 288 to become energized. Consequently, no signal is provided to any of the RLS ports 260, 262, and 264 from the port 266 by way of end node 293 and contacts 291, 292, and thus the RLS ports provide feedback signals to the RLSs 112 indicating that no isolation has occurred. It should further be noted that, since in the present embodiment only the ports 266, 268 are connected to control modules, the port 270 is configured (e.g., a jumper cable is placed on the port 270) in a manner resulting in the coil 290 being always-energized, such that the normally-open contact 292 is always closed.

When one (or more) of the RLSs 112 are switched to an "OFF" state (e.g., intended to cause each of the control modules 102, 103 to produce isolation). In this case, "OFF" signals are communicated to one (or more) of the RLS ports 260, 262, 264. Supposing that it is an RLS connected to the RLS port 260 (e.g., the RLS marked "RLS 1" in FIG. 2) that is turned "OFF", the RLS port 260 open-circuits the two communication links 286 with respect to the two communication links 284, respectively, and thereby breaks the daisy-chain. As a result, the safety relay 271 enters an "OFF" state in which each of the coils 273, 275 is de-energized, which in turn causes each of the normally-open contacts 277, 279 to become open.

Due to the opening of the contacts 277, 279, each of the ports 266 and 268 provides a respective pair of signals (corresponding to the two contacts associated with the port) via its respective communication link 115 and 215 to its respective internal control module 102, 103. Upon receiving their respective pairs of signals, each of the internal control modules 102, 103 causes isolation and, assuming isolation is confirmed by each internal control module, each internal control module in turn provides a respective feedback signal indicating isolation to its respective port 266, 268. Upon receiving the appropriate feedback signals, the port 266 energizes the node 293 and the port 268 energizes the coil 288, such that the contact 291 becomes closed. Since as discussed above the contact 292 is always closed in the present embodiment, the energizing of the node 293 and coil 288 results in a signal/power being provided from the end node 293 to each of the RLS ports 260, 262, and 264, indicating that all of the machines 108,109 governed by the control modules 102, 103 have been isolated.

The RLSs 112 thus receive feedback signals from the RLS ports 260, 262 and 264 and, in response to these feedback signals, indicator lights (or other indicators) on those of the RLSs that are turned OFF (but not typically the other RLSs that remain ON) are illuminated/turned on so as to indicate isolation. Also, in at least some embodiments, when a proper isolation condition is met (e.g., when the RLS ports 260, 262, 264 are receiving the signal indicating isolation), an indicator light or other indication is switched on at the multiplexer module 111 as well indicating that to be the case. It should be noted further that, in a situation where one (or more) of the control modules 102, 103 has not become properly isolated notwithstanding the command provided to it, the proper feedback signal(s) indicating isolation is/are not communicated back to one or both of the ports 266, 268. In such circumstance, the one or both ports 266, 268 fail to become energized (e.g., to energize the end node 293 or the coil 288), such that the RLS ports 260, 262, 264 do not receive a signal indicating proper isolation.

In view of the above description, the module 111 can be understood as performing signal distribution, splitting, multiplication, and/or system multiplexing functions. That is, because any given triggering action by any given RLS can cause all of the control modules (e.g., both of modules 102, 103) to become isolative, the module 111 serves to distribute, split, or multiply the input signal of a given RLS. Also, if two or more RLSs are triggered simultaneously, then an overall signal representative of the statuses of those RLSs is provided to all of the control modules. Further, it should also be evident that the feedback signals provided to the ports 266, 268, 270, etc. are also effectively "multiplexed" insofar as the multiple feedback signals results in a single particular signal being provided back to a given one (or more) of the RLSs. For at least these reasons, the module 111 has been termed a "multiplexer module" herein, albeit the module could also be termed a "multiplier module" or a "distribution module" as well.

It should be further noted that, although the module 111 is referred to as a "multiplexer module" herein, the use of this term is not intended to limit the scope of the present invention to module(s) or other component(s) that perform "multiplexing" as it may be conventionally understood in various circumstances. Rather, the present invention is intended to encompass a wide variety of embodiments of systems that allow one or more control devices or signal sources (such as, but not limited to, RLSs) to interact with multiple isolation modules that are capable of electrically, pneumatically, hydraulically, or otherwise isolating machinery or other load(s). Further, "isolation systems" as used herein are intended to broadly include a variety of types of isolation systems as well as systems that provide related functions such as grounding and isolation systems, or systems that provide varying levels or degrees of isolation in addition to or rather than merely complete isolation.

Thus, notwithstanding the above description relating to FIGS. 2 and 3, the present invention is intended to encompass a variety of alternate embodiments other than that shown.

For example, the present invention is intended to encompass not merely control systems such as the control system 100 having two control modules 102, 103 as shown, but also is intended to encompass control systems having any number of control modules greater than one (e.g., three or four control modules), where an additional module or control device is utilized to connect each of the individual control modules to the same set of RLSs. Also, while the exemplary control system 100 of FIG. 2 is shown to control the isolation of the two machines 108, 109, in alternative embodiments the control system 100 (or other control system encompassed by the present invention) could be employed in relation to one or more than two (or, indeed, any number) of machines or equipment. While the multiplexer module 111 of FIG. 3 utilizes the daisy-chained communication links 280-286 and the series connection of the port 266 via the end node 293 with the contacts 291-292 to develop signals that are representative of the statuses of multiple devices, in alternate embodiments other techniques could be employed.

Further, the present invention is intended to encompass control systems having an additional module such as the multiplexer module 111, where the input signals provided to the multiplexer module 111 come not from RLS-type control devices, but instead come from other control devices or signal sources. Such other signal sources could include, for example, computerized control devices (e.g., a microprocessor or programmable logic device), remote devices such as devices coupled to the multiplexer module by way of the internet or other long-distance communication linkages (including wireless communication linkages), as well as other types of devices such as sensors that are monitoring various conditions of interest. Further, in some embodiments of the present invention, the multiplexer module 111 is intended to communicate with other devices via network-type communication devices. That is, for example, the communication links 113, 115, 215 could be provided via one or more communication networks.

Additionally, although the multiplexer module 111 can take the form shown in FIG. 3, it can also take a variety of other forms depending upon the embodiment. As noted above, the multiplexer module 111 can vary in terms of the number of RLSs and/or control modules with which it is designed to communicate, can vary in terms of the type(s) or number(s) of safety relays that it employs, and/or can vary in terms of the degree of redundancy that is provided. In some embodiments, the safety relays and/or other circuit components can be replaced with various other control devices such as microprocessors, programmable logic devices, etc. Further, in some other embodiments, the multiplexer module 111 can take forms that vary significantly from that shown in FIG. 3. For example, in some embodiments the multiplexer module 111 can employ "safe" commercial networks or network components, such as CIP Safety componentry, DeviceNet Safety componentry, and/or Ethernet Safety componentry, rather than (or in addition to) safety relays. In at least some embodiments, the multiplexer module 111 (and/or the overall control system 100 employing the multiplexer module 111) is Category 4 Safety compliant.

Additionally for example, in one such embodiment, the multiplexer module 111 would simply take the form of an "AND" gate (or, alternatively, a "NAND" gate) that receives each of the signals from the RLSs 112 and provides onto each of the communication links 115, 215 a signal representing the sum of each of the RLS signals. In such embodiment, if any one or more of the signals from the RLSs 112 take on a low value due to actuation of such RLS(s) to an "OFF" status, then a low signal is provided to each of the internal control modules 128, 228, causing each of the machines 108, 109 to be isolated from both electrical and pneumatic power. Conversely, if all of the signals from the RLSs 112 take on a high value representing that all of the RLS(s) have an "ON" status, then a high signal is provided to each of the internal control modules 128, 228 resulting in power being delivered to the machines 108, 109.

Indeed, the present invention further is intended to encompass a wide variety of intermediate modules that interconnect control devices or signal sources such as (but not limited to) the RLSs 112 providing input/command signals with two or more control modules or systems such as the control modules 102, 103, but that operate differently than the multiplexer module 111 as discussed above. For example, the above-described multiplexer module 111 can be replaced with an alternate multiplexer module that receives not only the signals over communication links 113 as inputs but also receives one or more additional control signals at one or more additional input terminals. Such additional control signals can be used, for example, to select one or more of the signals provided on one or more of the communication links 113 for provision to the control modules 102, 103. Also for example, such additional control signals can be used to determine whether a given output signal is provided to the first control module 102, the second control module 103, or both.

In further alternate embodiments, a module taking the place of the multiplexer module 111 can output the same number of signals to each of the control modules 102, 103 as are received at its inputs (e.g., in the embodiment of FIG. 2, six signals in each case). As described above, in at least some embodiments, the module 111 is capable of directing signals in two or more directions, thereby allowing signals to be both conveyed from the RLSs 112 (or other signal sources or other devices taking the place of the RLSs) to the internal control modules 128, 228 and also conveyed from the internal control modules back to the RLSs 112 (or other devices). Yet, in other embodiments, the multiplexer module only communicates in one direction with respect to one or both of the RLSs 112 (or other control devices/signal sources) and the control modules 102, 103. In further embodiments, one or more intermediate modules could be employed to perform various signal processing functions.

Figure 4:
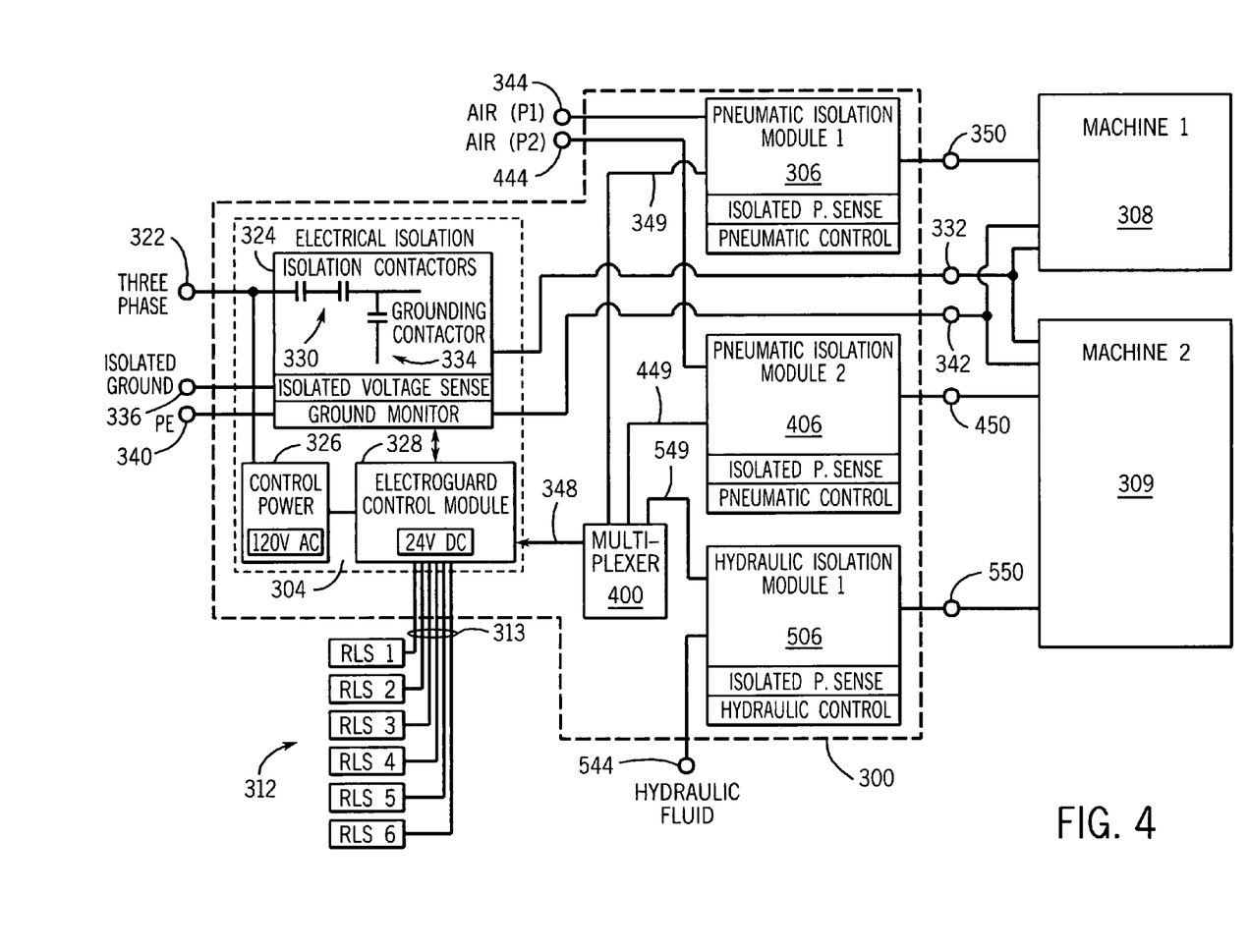
FIG. 4 shows in schematic form an improved control system in accordance with another exemplary embodiment of the present invention, where the improved control system includes multiple (in this case, two) pneumatic/hydraulic power isolation systems and a multiplexer module coupled between an electrical power isolation system and each of the multiple pneumatic/hydraulic power isolation systems.

Turning to FIG. 4, another improved control system 300 in accordance with certain further embodiments of the present invention is shown in schematic form. In contrast to the control system 100 of FIG. 2, the control system 300 includes only a single electrical power isolation system 304 that, like the electrical power isolation system 104, includes an electrical isolation module 324, a control power module 326 and an internal control module 328. As with respect to the electrical power isolation system 104, the electrical power isolation system 304 receives three-phase power at an electrical input port 322, and that power is provided both to the electrical isolation module 324 and to the control power module 326, which in turn provides 120 Volt AC power to the internal control module 328 generated from the three-phase power provided via the input port 322.

Also as shown, based upon control signals provided from the internal control module 328 to the electrical isolation module 324, the electrical isolation module operates isolation contactors 330 so as to connect or disconnect the three-phase power to and from an electrical output port 332, to which is coupled first and second machines 308 and 309, respectively. Upon disconnecting the three-phase power from the electrical output port 332, the electrical isolation module 324 further controls grounding contactor(s) 334 so as to ground the electrical output port by connecting the port to an isolated ground port 336, such that the first and second machine 308, 309 are fully isolated from the three-phase power source (not shown) providing power to the input port 322. The electrical isolation module 324 of the control system 300 also includes a PE input port 340 and an output port 342 coupled to each of the machines 308, 309.

In further contrast to the control system 100 of FIG. 2, the control system 300 has no multiplexer module coupled between one or more RLSs 312 and the internal control module 328. Rather, the RLSs 312 are directly coupled to the internal control module 328. Thus, when one or more of the RLSs 312 is switched to an "OFF" state, appropriate signal(s) are provided to the internal control module 328 in response to which the internal control module causes the electrical power to be decoupled from the output port 332 and causes that output port to be connected to the ground port 336, such that the machines 308, 309 are isolated and grounded. Likewise when all of the RLSs 312 are switched to their "ON" states, the internal control module 328 disconnects the output port 332 from the ground port 336 and couples the three-phase power to that output port.

Although the control system 300 does not include any multiplexer module coupled between the RLSs 312 and the internal control module 328, the control system 300 does include a fluidic multiplexer module 400 that enables the single electrical power isolation system 304 to be operated in conjunction with multiple fluidic (e.g., hydraulic or pneumatic) power isolation systems, which in the present embodiment are shown to include a first pneumatic power isolation system 306, a second pneumatic power isolation system 406, and a first hydraulic power isolation system 506. As discussed above with respect to the multiplexer module 111, depending upon the embodiment, the multiplexer module 400 can be in unidirectional or bidirectional communications with the control module 328 and the power isolation modules 306, 406, and 506.

In some embodiments (and as discussed further below with respect to FIG. 5), the multiplexer module 400 allows for bidirectional communications with all of these devices. More specifically, the multiplexer module 400 not only receives commands from the control module 328 and provides those commands to the power isolation modules 306, 406, and 506, but also receives feedback from the power isolation modules and communicates appropriate signals back to the control module 328 as well. In some such embodiments, the multiplexer module 400 is configured to determine whether all of the power isolation modules 306, 406, and 506 have entered an isolated state in response to a command from the control module 328. Only when all of the power isolation modules 306, 406, 506 have in fact entered the isolated state does the multiplexer module 400 provide a feedback signal to the control module 328 indicating that the fluidic power sources have entered the isolated state. The entire control system 300 has entered the isolated state such that the machines 308, 309 are isolated from all of the relevant power sources when the control module 328 receives isolation signals from multiplexer 400 and the electrical isolation module 324.

As with the pneumatic power isolation systems 106, 206 discussed with reference to FIG. 2, each of the power isolation systems 306, 406, and 506 is coupled to a respective fluidic input port 344, 444 and 544, which are also input ports of the overall control system 300. By way of the respective input ports 344, 444 and 544, the respective power isolation modules 306, 406, 506 are coupled to respective pneumatic or hydraulic sources (not shown) from which the respective power isolation modules receive respective pneumatic or hydraulic inputs such as (as shown) air at a first pressure, air at a second pressure, and hydraulic fluid. Based upon control signals received via respective communication links 349, 449 and 549 from the fluidic multiplexer module 400, the power isolation modules 306, 406 and 506 either connect or disconnect respective fluidic output ports 350, 450 and 550 of the control system 300 in relation to the respective fluidic input ports 344, 444, and 544 and thus in relation to the respective pneumatic or hydraulic inputs.

When the respective fluidic output ports 350, 450 and 550 are disconnected from the respective fluidic input ports 344, 444, and 544, the machines 308 and 309 are isolated from the respective pneumatic or hydraulic inputs associated with those respective ports. The pneumatic and hydraulic isolation module provide feedback indicating that the fluidic energy has been isolated via the respective communication links 349, 449 and 549 to the multiplexer 400, which provides a feedback signal to the control module 328. Since the feedback signal to the control module 328 is based upon multiple feedback signals provided via the communication links 349, 449 and 549, the feedback signal provided to the control module 328 can be viewed as a multiplexed signal. In the present embodiment, the machine 308 is shown to be coupled to the output port 350 so as to be capable of receiving the first pneumatic input provided at the input port 344, while the machine 309 is shown to be coupled to each of the output ports 450 and 550 so as to be capable of receiving the second pneumatic input and first hydraulic input provided at the output ports 444 and 544, respectively. In alternate embodiments, however, the machines 308, 309 could be replaced or modified in a variety of different ways. For example, the machines 308, 309 could be replaced with a single machine that was coupled to each of the output ports 344, 444, 544 or, also for example, the machines 308, 309 could be replaced with three machines, where each of the respective machines was coupled to a respective one of the output ports 344, 444, 544.

More generally, the control system 300 is intended to be representative of a variety of different control system embodiments in which a single electrical power isolation system such as the system 304 is capable of being interconnected with and operating in conjunction with two or more pneumatic and/or hydraulic (or otherwise "fluidic") power isolation systems by way of a multiplexer module or other intermediate module. Thus, in some alternate embodiments, for example, the three power isolation modules 306, 406, 506 could instead be replaced with two isolation modules, four isolation modules or possibly any number of modules relating to different pneumatic and/or hydraulic (or other fluidic) power sources. In each such embodiment, the multiple isolation modules would all be governed by signals received from the same multiplexer or other intermediate module or modules that based those signals upon other signals received from the single internal control module of the electrical power isolation system. Further, the control system 300 is representative of embodiments in which the fluidic power isolation systems provide control signals to an intermediate module that then provides signals to electrical power isolation systems.

Figure 5:
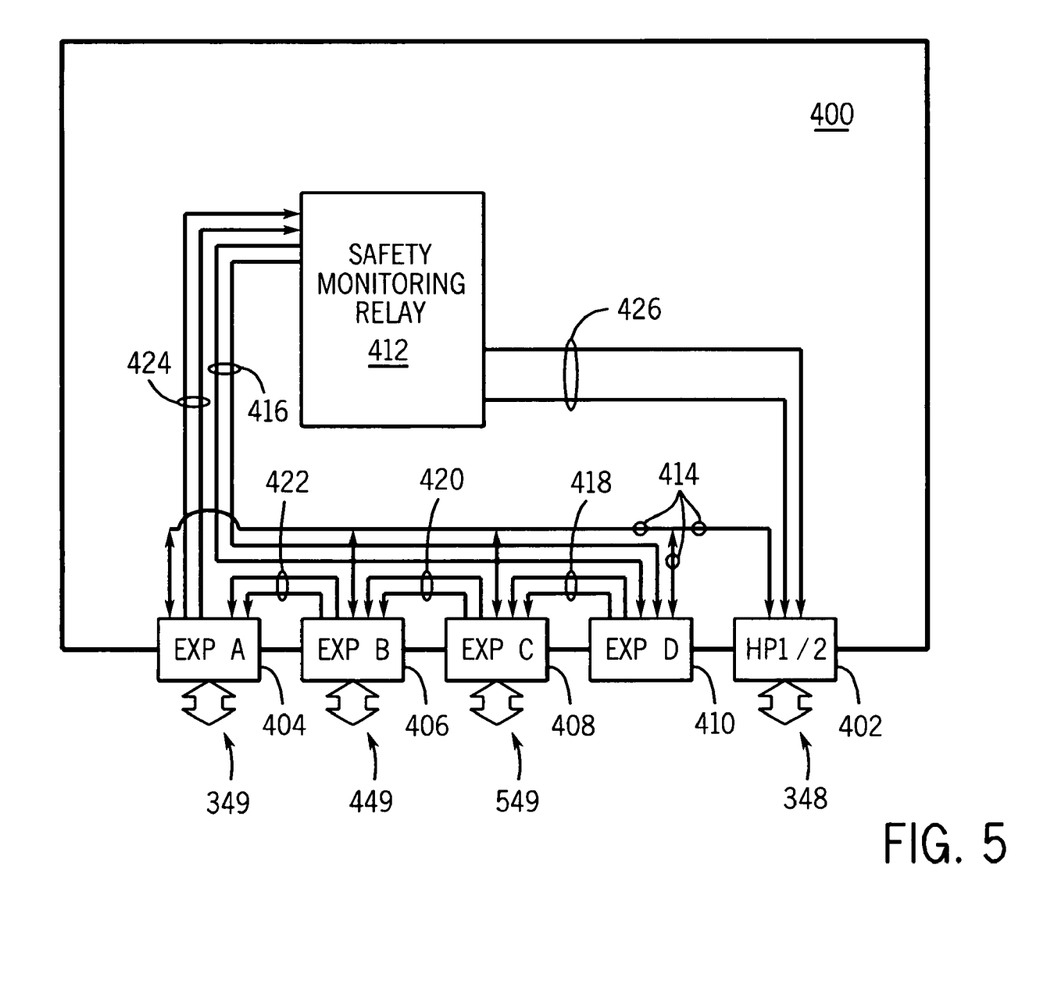
FIG. 5 shows in schematic form an exemplary embodiment of the multiplexer module of FIG. 4 in more detail.

Turning to FIG. 5, one exemplary embodiment of the multiplexer module 400 of FIG. 2 is shown in more detail. In particular as shown, the multiplexer module 400 includes a first port 402 (labeled "HP ½") configured for communication via the communication link 348 with the internal control module 328 (see FIG. 4). Also, the multiplexer module 400 further includes second, third, fourth and fifth ports 404, 406, 408 and 410 (labeled "EXP A", "EXP B", "EXP C" and "EXP D", respectively) that are configured for communication via respective communication links with different pneumatic and/or hydraulic (or possibly other types of) power isolation modules. When implemented in the embodiment shown in FIG. 4, with its three power isolation modules 306, 406, and 506, only the second, third and fourth ports 404, 406, 408 are coupled by way of the communication links 349, 449 and 549 with power isolation modules, while the fifth port 410 left uncoupled (umpers installed). In alternate embodiments employing four power isolation modules, however, the fifth port likewise could be coupled to such a power isolation module by such a communication link. Indeed, the present invention is intended to encompass a variety of embodiments of multiplexer modules capable of being connected to an arbitrary number (albeit typically greater than one) of power isolation modules, by way of an arbitrary number of ports.

Further as shown in FIG. 5, the multiplexer module 400 also includes a safety relay 412 that is coupled to each of the ports 402-410. In the present embodiment, the safety relay 412 can be a 440R-N23125 safety relay available from Rockwell Automation, Inc. of Milwaukee, Wis., the beneficial assignee of the present application, albeit in alternate embodiments any of a variety of other safety relays or other components could also be used. The safety relay 412 and the ports 402-410 are coupled with one another in several manners. First, the port 402 is coupled to each of the other ports 404-410 by way of a primary control line 414, which is intended to (at least in some embodiments) be representative of a plurality of connections. By virtue of the primary control line 414, signals received from the internal control module 328 via the port 402, for example, isolation commands, are communicated to each of the ports 404-410, such that those signals can then be further sent to the power isolation modules coupled to those ports 404-410. Additionally, the primary control line 414 is capable of communicating power or other signals among the ports 402-410. In particular, as indicated by the double-sided arrows associated with the primary control line 414, status or other information regarding the status of the ports 404-410 (or possibly the power isolation modules coupled to those ports as well) can be communicated to the port 402, for transmission back to the internal control module 328 or possibly to another location such as, for example, a PLC.

In addition to the primary control line 414, the safety relay 412 is in communication with the port 402 by a pair of redundant communication links 426, which allow the safety relay 412 to communicate feedback signals back to the internal control module 328 by way of the port 402. Further, the safety relay 412 is in communication with each of the ports 404-410 by way of a pair of redundant, daisy-chained communication links. More particularly, the safety relay 412 sends out two redundant signals by way of a pair of communication links 416, which in turn are coupled to the port 410. The port 410 in turn, depending upon its status (which in turn depends upon feedback received from the corresponding power isolation system) can communicate the two redundant signals by way of a pair of communication links 418, which in turn are coupled to the port 408. The port 408 in turn, depending upon its status (again depending upon the status of its corresponding power isolation system) can communicate the two redundant signals by way of a further pair of communication links 420, which in turn are coupled to the port 406. The port 406 in turn, depending upon its status (again depending upon the status of its corresponding power isolation system) can communicate the two redundant signals by way of a further pair of communication links 422, which in turn are coupled to the port 404. The port 404 in turn, depending upon its status (again depending upon the status of its corresponding power isolation system) can communicate the two redundant signals by way of an additional pair of communication links 424, which in turn are coupled back to the safety relay circuit 412.

Given the design shown in FIG. 5, the multiplexer module 400 operates as follows. At a start time, presumably no isolation command has been given by the internal control module 328 that the power isolation systems (e.g., the power isolation systems 306, 406, and 506) isolate the machines coupled thereto (e.g., the machines 308, 309). The feedback signals provided from the power isolation systems to the ports 404-408 (in the present case, port 410 is not coupled to any power isolation system, jumpers are installed) indicate that the power isolation systems are not isolated. Because the feedback signals indicate non-isolation, the ports 404-408 serve to open-circuit the connections of the lines 418 to lines 420, the lines 420 to 422, and the lines 422 to lines 424. Consequently, the safety relay 412 fails to communicate via lines 426, any indication that the power isolation modules 306, 406, 506 are in an isolative state via port 402. Possibly, although not necessarily, these indications provided to the ports 404-408 are also communicated back to the internal control module 328 via the primary control line and the port 402.

At a later time, when an isolation command is provided by the internal control module 328 to the port 402, the isolation command is communicated to each of the power isolation modules 306, 406, 506 by way of the primary control line 414 and the ports 404, 406 and 408. Assuming all of the power isolation modules 306, 406, 506 then become isolated, the modules provide feedback signals indicating isolation to the ports 404, 406 and 408. In response to the feedback signals, each of the ports 404, 406 and 408 become close-circuited so as to couple the communication links 424 and 422 together, the communication links 422 and 420 together, and the communication links 422 and 420 together, respectively. Also, in this embodiment where the port 410 is not coupled to any power isolation module, the port typically is configured (e.g., a jumper cable is attached) so as to result in the close-circuiting of the communication links 416 and 418.

Consequently, in response to the feedback signals provided to the ports 404, 406, and 408m the safety relay 412 is able to sense that the signal provided onto the communication links 416 is returned via the communication links 424, and thus determine that all of the power isolation modules are in fact in an isolation condition. When the safety relay 412 determines this to be the case, the safety relay 412 sends additional redundant signals via the communication links 426 to the port 402 for provision to the internal control module 328 indicating that all of the power isolation modules are in an isolated state. It should be noted further that, since all of the ports 404-410 are connected in the daisy-chained manner, if any of the power isolation modules fails to enter the isolated state in response to the command signal provided thereto, one or more of the connections in the daisy-chain is/are broken such that no indication of isolation is determined by the safety relay 412 or communicated to the internal control module 328.

Although FIG. 5 illustrates in a figurative manner certain possible embodiments of the multiplexer module 400, it should be understood that various aspects of the multiplexer module 400 can vary from embodiment to embodiment. For example, while in certain embodiments the ports 404-410 are "active" devices insofar as the ports actively open-circuit or close-circuit their respective pairs of communication links 416-424 in response to feedback (possibly redundant feedback) signals received from the power isolation modules coupled to those ports, in other embodiments the ports are simply passive devices in this regard. That is, in at least some embodiments, the ports 404-410 merely serve to couple their respective pairs of communication links 416-424 (e.g., by way of four connections on each of the ports) with their respective power isolation modules, and it is the power isolation modules that close-circuit or open-circuit the respective pairs of communication links. The present invention is also intended to encompass a variety of other embodiments that have varying numbers of communication links, varying degrees of redundancy, varying types of safety relays, control devices (e.g., controllers, microprocessors), ports, or other components.

Notwithstanding the above discussion regarding FIGS. 4 and 5, the multiplexer module 400 can take a variety of forms depending upon the embodiment. For example, the module could employ one or more logic gates such as "OR", "AND", "NOR", "NAND", or inversion gates. In the control system 300 of FIG. 4, the multiplexer module 400 can simply take the form of a signal splitter (or divider or replicator) that relays the signal provided on the communication link 348 to each of the power isolation modules 306, 406 and 506. Nevertheless, in alternate embodiments, the multiplexer (or other intermediate) module 400 instead could take on more complicated forms. For example, if multiple signals (e.g., on multiple communication links) were provided from the internal control module 328 of the electrical power isolation system 304 to the multiplexer module, and additional control signals could be provided to the multiplexer module from the internal control module or another source (e.g., from a source external to the control system 300), the multiplexer module could perform a function of selecting which of several signals is/are to be provided onto the communication links 349, 449, 549.

Further for example, in some alternate embodiments, the multiplexer module need not always (or ever) provide the same signals on each of the communication links 349, 449, 549, but rather could provide different signals on those different communication links. Also for example, in some embodiments the multiplexer module can utilize other technologies such "safe"communication network technologies (e.g., CIP Safety, DeviceNet Safety, Ethernet Safety, etc.). As indicated above with respect to the multiplexer module 111, the multiplexer module can be replaced with a variety of intermediate module(s) depending upon the embodiment, and need not be a "multiplexer" in any conventional sense. Indeed, just as the multiplexer module 111 can take on a variety of different embodiments as described above, it should be recognized that the multiplexer module 400 can also take the same (or similar) forms.

Also as discussed with respect to FIG. 2, the control system 300 is intended to be representative of embodiments of control systems that, rather than (or in addition to) receiving input signals from the RLSs 312 as shown, instead (or also) receive input signals from other types of devices such as computerized control devices, remotely-located devices, etc. Also, in some embodiments, the internal control module 328 of the control system 300 can also (or instead) output signals to external devices rather than just receive signals from devices such as the RLSs 312. Further, in some embodiments, the multiplexer module 400 could communicate with other devices via networks (e.g., the communication links 348, 349, 449, and 549 shown in FIG. 4 could be provided via one or more networks).

Indeed, it is envisioned that the control systems 100, 300 described herein (and variations thereof) will in some circumstances also operate in conjunction with additional control devices such as a "verification module" as described in copending U.S. patent application Ser. No. 11/226,154 entitled "Improved Control System Having Verification Module" and filed on Sep. 14, 2005, which is hereby incorporated by reference herein. Further, it is envisioned that in some embodiments of the present invention various aspects of the control systems 100, 300 could be employed in combination. For example, several of the control systems 300 could be grouped together into a single larger control system that additionally included the multiplexer module 111 (or other intermediate module) coupled between the internal control modules of the electrical power isolation systems of the larger control system and external devices such as RLSs. Additionally, in some alternate embodiments, chains or groups of multiplexer modules or other intermediate modules could be employed.

Depending upon the embodiment, the physical assembly and construction of the control systems described above can vary considerably. For example, in at least some embodiments, the components associated with the first and second control systems 102, 103 of the control system 100 are contained within distinct housings that are separate from each other and also separate from a further distinct housing containing the multiplexer module 111. In alternate embodiments, all or most of the components of the control system 100 could be contained within a single housing. Also for example, in some embodiments, the components associated with the electrical power isolation system(s) could be contained in housing(s) that were separate from the housing(s) containing the pneumatic or hydraulic power isolation systems.

It is specifically intended that the present invention not be limited to the embodiments and illustrations contained herein, but include modified forms of those embodiments including portions of the embodiments and combinations of elements of different embodiments as come within the scope of the following claims.

I claim:

1. A system for isolating at least one load from multiple power sources, the system comprising:
   a first power isolation system capable of receiving a first power from a first input port and determining whether the first power is communicated to a first output port, the first power isolation system being a first electrical power isolation system;
   a second power isolation system capable of receiving a second power from a second input port and determining whether the second power is communicated to a second output port, the second power isolation system being a second electrical power isolation system; and
   an intermediate module connected with the first and second power isolation systems, wherein the intermediate module allows for at least one intermediate control signal to be provided to the first and second power isolation systems,
   wherein the intermediate module receives a respective additional signal from each of the first and second power isolation systems, the respective additional signals being indicative of whether the respective power isolation systems have respectively attained an isolated state; and
   wherein the intermediate module generates an output signal that is based upon each of the respective additional signals from the first and second power isolation systems, and that is indicative of whether both of the first and second power isolation systems have attained the isolated state.

2. The system of claim 1, wherein the first input port is a first electrical input port, and the first output port is a first electrical output port.

3. The system of claim 1, wherein the intermediate module is configured to receive at least one external control signal and operate in response thereto.

4. The system of claim 3, wherein the at least one intermediate control signal is at least partly based upon the at least one external control signal, and wherein the at least one external control signal includes a plurality of signals provided from a plurality of remote lockout switches (RLSs).

5. The system of claim 4, wherein
   the intermediate module is configured to transmit the output signal to the at least one external device.

6. The system of claim 5, wherein the at least one intermediate control signal is provided to respective internal control modules of the first and second electrical power isolation systems.

7. The system of claim 6, wherein the at least one intermediate control signal includes a first intermediate control signal provided to a first of the internal control modules that is within the first electrical power isolation system, and a second intermediate control signal provided to a second of the internal control modules that is within the second electrical power isolation system, the first and second intermediate control signals being substantially identical to one another.

8. The system of claim 7, wherein the intermediate module includes at least one safety relay circuit.

9. The system of claim 7, wherein the at least one external control signal includes a plurality of external control signals, wherein the intermediate module includes an AND gate that receives the plurality of external control signals and provides a gate output signal indicative of whether at least one of the external control signals has a low value, and wherein each of the first and second intermediate control signals is based upon the gate output signal, the intermediate module serving to split the gate output signal into the first and second intermediate control signals.

10. The system of claim 1, wherein the intermediate module serves to at least one of distribute a first signal to multiple locations, split the first signal, multiply the first signal, and generate the first signal based upon a plurality of received signals received from a plurality of devices.

11. The system of claim 1, wherein the intermediate module both provides the at least one intermediate control signal to the first and second power isolation systems in response to a primary input signal received by the intermediate module from an other device, and provides the output signal for receipt by the other device.

12. The system of claim 1, wherein the intermediate module receives at least one input signal and also at least one additional control signal, and wherein an operation of the intermediate module is determined at least in part by the at least one additional control signal.

13. An intermediate module for use in controlling first and second electrical power isolation systems, the intermediate module comprising:
   at least one first terminal configured to receive at least one input signal and to send at least one output signal;
   at least one second terminal configured for communications with the first and second electrical power isolation systems, wherein the at least one second terminal is configured to provide control signals for receipt by the first and second electrical power isolation systems and to receive feedback signals from each of the first and second electrical power isolation systems indicative of whether the first and second electrical power isolation systems have entered an isolated state in response to the control signals; and means for processing the at least one input signal to generate the control signals, and further processing the feedback signals to generate the at least one output signal, wherein the means for processing includes at least one redundant component that enhances reliability of the intermediate module, and wherein the at least one output signal is indicative of whether both of the first and second electrical power isolation systems have attained the isolated state.

14. The intermediate module of claim 13, wherein the intermediate module is configured to receive the at least one input signal from at least one remote lockout switch, and to provide the at least one output signal to the at least one remote lockout switch.

15. The intermediate module of claim 13, wherein the means for processing includes at least one of: a multiplexer; a safety relay, a coil, a contact, a signal splitter; a signal divider; a signal replicator, a signal distributor, a signal multiplier, an OR gate; an AND gate; a NOR gate; a NAND gate; and an inverter.

16. An apparatus for coordinating operations of a plurality of electrical power isolation systems, the apparatus comprising:

at least one first port that receives at least one command signal and also provides at least one first feedback signal;

a plurality of second ports that respectively provide a plurality of related signals to the plurality of electrical power isolation systems and receive a plurality of second feedback signals from the plurality of power isolation systems;

at least one internal circuit component coupled to the first port and the plurality of second ports, wherein, due at least in part to the at least one internal circuit component, the first feedback signal indicates whether both of the electrical power isolation systems have attained the isolated state in response to the related signals.

17. The apparatus of claim 16, wherein the at least one internal circuit component includes at least one of a safety relay circuit, a coil, a plurality of contacts, a daisy-chained wire circuit, and a digital logic gate.

18. The apparatus of claim 16, each of the ports is a bidirectional port capable of receiving and transmitting signals, and wherein the at least one internal circuit component includes at least one redundant circuit component.

19. A system comprising the apparatus of claim 16, the system further comprising:

the plurality of power isolation systems, wherein the plurality of power isolation systems includes the plurality of electrical power isolation systems, and wherein the second ports are respectively coupled to the electrical power isolation systems.

20. The system of claim 19, wherein the at least one first port is coupled to at least one of a RLS, a network, a remote device, a computer and another operator interface.

21. A method of implementing a safety isolation system having first and second electrical isolation systems, the method comprising:

providing an intermediate module that is coupled to each of first and second electrical power isolation systems and also coupled to an external device;

receiving a first signal at the intermediate module from the external device requesting that each of the first and second electrical power isolations systems proceed to an isolated state;

providing respective second signals based at least in pan upon the first signal to each of the first and second electrical power isolation systems from the intermediate module;

receiving respective third signals from the first and second electrical power isolation systems, respectively, wherein each of the third signals is indicative of whether the respective electrical power isolation system has attained an isolated state; and sending a fourth signal tat is based upon the third signals from both of the first and second electrical power isolation systems and indicative of whether both of the first and second power isolation systems have attained the isolated state.

* * * * *